Figure 1:
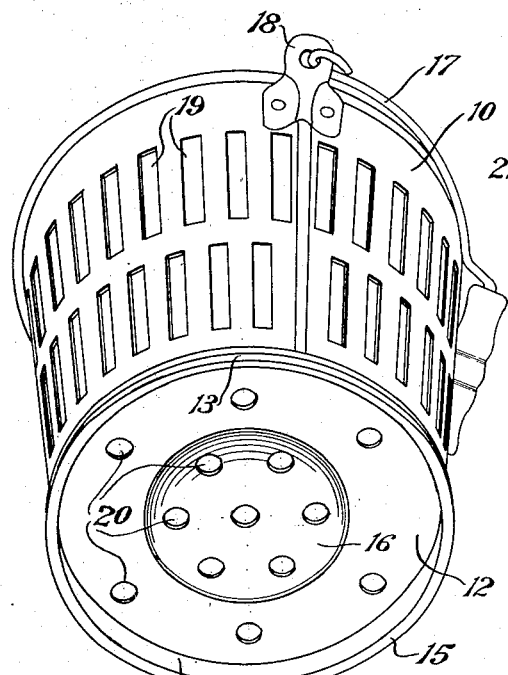

Nov. 10, 1936.  W. M. MITCHELL  2,060,468
EGG GATHERING BUCKET
Filed Aug. 24, 1933

INVENTOR
W. M. Mitchell
BY
Frease and Bishop
ATTORNEYS

Patented Nov. 10, 1936

2,060,468

UNITED STATES PATENT OFFICE 2,060,468

EGG GATHERING BUCKET

Wellington M. Mitchell, Millersburg, Ohio

Application August 24, 1933, Serial No. 686,502

1 Claim. (Cl. 220—1)

The invention relates to buckets for gathering poultry eggs from nests and more particularly to a ventilated bucket which permits the eggs to cool quickly and provides for the escape of gases or vapors which are thrown off by newly laid eggs.

It has been discovered that freshly laid eggs must be rapidly cooled in order to properly preserve the eggs and furthermore, it has been found that certain gases or vapors, the exact nature of which is not yet definitely known, are thrown off by newly laid eggs and that certain of these gases or vapors are apparently heavier than air. It is the present theory of scientists connected with agricultural experimental stations that in order to properly preserve eggs they should not only be rapidly cooled but that these gases or vapors should be permitted to quickly escape.

Attempts have recently been made to provide ventilated buckets or baskets for gathering newly laid eggs but all of such buckets or baskets which have come into use up to the present time have been formed of wire and it has been found by experience that these wire buckets or baskets are not satisfactory because of the fact that the small surface of the wire contacting with the eggs has a tendency to check the eggs and in many cases the shell is actually cracked or crushed by contact with the wire.

The object of the present improvement is to provide a ventilated bucket which permits the eggs to be rapidly cooled and allows for the quick escape of any gases or vapors thrown off by the eggs, the bottom as well as the side walls of the bucket being perforated so that any heavier than air gases or vapors thrown off by the eggs may quickly escape.

A further object is to provide such a bucket with a contacting surface sufficient to prevent checking of the eggs or cracking or crushing of the shells thereof so that the eggs may be gathered and handled in the usual manner without any harmful effects.

The above and other objects may be attained by providing a sheet metal bucket or pail, the side walls of which are provided throughout substantially their entire area with perforations which may be in the form of elongated slots or substantially circular apertures, the spaces between perforations being substantially equal to the width or diameter of each perforation, whereby sufficient ventilation is provided to permit the eggs to cool rapidly and to allow for the escape of any gases or vapors given off by the eggs, while at the same time sufficient surface is presented to contact with the eggs so as not to check or crush the same; the invention further consisting in perforating the bottom wall of the bucket, a portion at least of which is preferably convex in order to provide sufficient space below the same to permit heavier than air gases or vapors thrown off by the eggs to escape through said perforated bottom.

The invention further contemplates the strengthening or reinforcing of the side walls of the bucket by forming flanges along the edges of the apertures which, if desired, may be folded back against the side walls, or by forming ribs in the spaces between the apertures.

Figure 3:
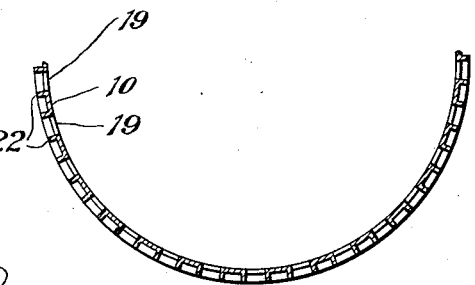
Figure 4:
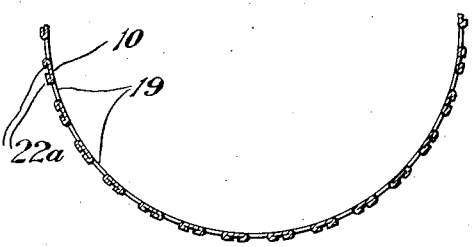
Figure 2:
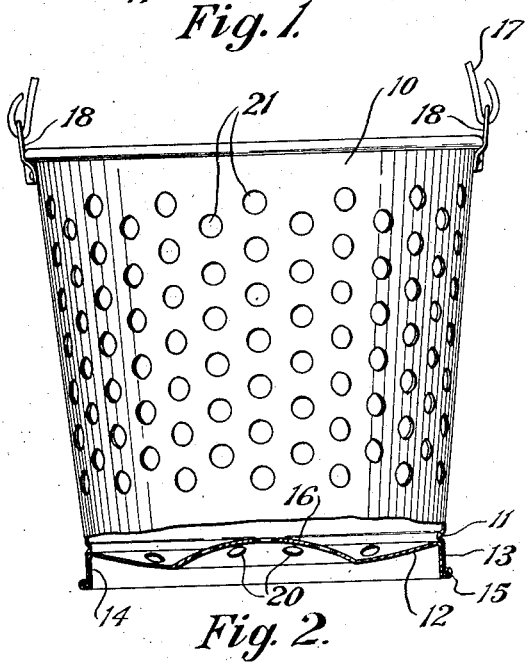
Figure 5:
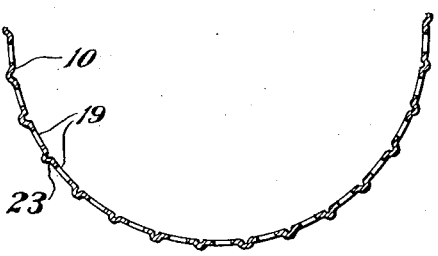

An embodiment of the invention, thus set forth in general terms, is illustrated in the accompanying drawing, in which Figure 1 is a perspective view of a bucket embodying the invention showing the side walls of the bucket provided with spaced elongated slots;

Fig. 2, a side elevation of the bucket partly in section showing the side wall provided with substantially round apertures;

Fig. 3, a partial transverse sectional view through the side wall of the bucket showing angular strengthening flanges provided at the sides of the apertures;

Fig. 4, a similar view showing the flanges folded back against the metal strips between apertures; and Fig. 5, a similar view showing ribs stamped into the metal strips between the apertures.

Similar numerals refer to similar parts throughout the drawing.

The improved egg gathering bucket or pail to which the invention pertains is preferably formed of sheet metal such as galvanized iron or the like and the side wall 10 may be slightly tapered toward the lower end of the pail, in usual manner, as illustrated in Figs. 1 and 2, and provided near its lower end with the internal annular rib 11 against which the bottom wall 12 is seated.

The side wall and bottom are provided with the respective depending annular flanges 13 and 14 folded together in the double folded seam 15 at the lower edge of the bucket. Thus the bottom 12 is spaced above the lower end of the bucket, providing a space to receive heavier than air gases, as will be later described, and in order to increase this space a portion at least of the bottom, for instance the central portion as indicated at 16, is preferably convexed.

For the purpose of carrying the bucket from place to place a conventional bail 17 may be connected to the upper open end portion of the bucket as by the usual ears 18 riveted or otherwise connected to diametrically opposite portions of the side wall 10.

As shown in Fig. 1, the side wall may be provided with elongated apertures or slots 19 located apart a distance substantially equal to the width of one of the slots and preferably arranged in two tiers as shown, covering substantially the entire area of the side walls, the slots in one tier being, if desired, staggered with reference to the slots in the other tier.

Perforations as indicated at 20 may also be provided throughout the bottom 13 whereby any heavier than air gases or vapors which are thrown off by the newly laid eggs may pass downward through the bottom of the bucket.

If desired, the apertures may be in the form of substantially circular openings as indicated at 21 in Fig. 2, these apertures being, if desired, arranged in staggered rows and spaced apart a distance substantially equal to the diameter of the apertures, substantially the entire area of the side wall being covered with the apertures in order to provide sufficient ventilation to quickly cool the eggs and permit gases or vapors given off thereby to readily escape.

As shown in Fig. 3 angular flanges 22 may be formed at each side of each of the apertures or slots 19 for the purpose of reinforcing and strengthening the side wall portion of the bucket; or as shown in Fig. 4, these flanges may be folded back upon the metal as indicated at 22a. If desired, the side walls may be strengthened by stamping ribs 23 in the metal of the side walls between the openings 19, as shown in Fig. 5.

From the above it will be obvious that sufficient ventilation is provided both in the side walls and bottom of the bucket to provide for quickly cooling eggs placed therein and to permit the rapid escape of any gases or vapors thrown off by the eggs, both through the side walls and through the bottom, in the case of any heavier than air gases, while at the same time the surfaces of the side walls and bottom, with which the eggs contact, are sufficiently large to prevent checking or crushing of the eggs by contact therewith.

The improved bucket described above and illustrated in the accompanying drawing may be produced to sell for less than half the price of such egg gathering buckets as are at present upon the market. The bucket is also much lighter in weight than buckets now in use for the same purpose. The bottom of the bucket is convexed not only for the purpose of ventilation but also to prevent contact of the same with the ground so as not to spring and break the eggs.

I claim:

An egg gathering bucket having side walls and a bottom spaced above the lower end of the bucket, the outer portion of said bottom being concave and the central portion being convex, there being apertures in the bottom and apertures throughout substantially the entire area of the side walls.

WELLINGTON M. MITCHELL.